United States Patent [19]

Stöck et al.

[11] Patent Number: 5,733,074
[45] Date of Patent: Mar. 31, 1998

[54] MANUAL TOOL FOR REMOVING MATERIAL FROM BRITTLE AND/OR NON-DUCTILE STOCK

[75] Inventors: Maximilian Stöck, Azmoos, Switzerland; Josef Obermeier, Peiting; Eugen Magyari, Gams, both of Germany; Peter Ofner, Feldkirch, Austria

[73] Assignee: Hilti Aktiengesellschaft, Schaan, Liechtenstein

[21] Appl. No.: 572,771

[22] Filed: Dec. 15, 1995

[30] Foreign Application Priority Data

Dec. 16, 1994 [DE] Germany ............... 44 44 853.8

[51] Int. Cl.⁶ ....................................... B23B 45/16
[52] U.S. Cl. ............... 408/17; 408/129; 408/145; 408/204; 451/165
[58] Field of Search .................. 408/17, 67, 129, 408/204, 145, 700; 451/165, 164, 360, 356, 358, 359

[56] References Cited

U.S. PATENT DOCUMENTS

| 2,792,674 | 5/1957 | Balamuth et al. ............... 451/165 |
| 2,818,686 | 1/1958 | Weiss . |
| 3,471,724 | 10/1969 | Balamuth . |
| 3,482,360 | 12/1969 | Legge ................... 451/165 X |
| 3,614,484 | 10/1971 | Shoh . |
| 3,754,448 | 8/1973 | McDaniel ............... 451/165 X |
| 4,524,543 | 6/1985 | Inoue ................... 451/165 X |
| 4,667,755 | 5/1987 | Müller et al. . |
| 4,828,052 | 5/1989 | Duran et al. . |
| 4,934,103 | 6/1990 | Campergue et al. ............... 451/165 |
| 5,009,553 | 4/1991 | Nowman ............... 408/145 X |
| 5,195,410 | 3/1993 | Young ............... 83/13 |
| 5,361,543 | 11/1994 | Bory ................... 451/165 |

FOREIGN PATENT DOCUMENTS

| 000900752 | 5/1972 | Canada .................. 451/165 |
| 0277823 | 8/1988 | European Pat. Off. . |
| 3919895 | 12/1990 | Germany . |
| A0182008 | 10/1984 | Japan ................... 408/17 |
| 406091599 | 4/1994 | Japan ................... 408/700 |
| 676097 | 12/1990 | Switzerland . |
| 000437537 | 7/1974 | U.S.S.R. ............... 451/165 |

OTHER PUBLICATIONS

European Search Report, No. EP 95 810 676.7 dated Apr. 19, 1996.

*Primary Examiner*—A. L. Pitts
*Assistant Examiner*—Henry W. H. Tsai
*Attorney, Agent, or Firm*—Anderson, Kill & Olick, P.C.

[57] ABSTRACT

A manual tool for removing material from brittle and/or non-ductile stock includes a housing (1) with a drive unit (2) for a tool bit (3) located within the housing (1). The tool bit is arranged to be rotated by the drive unit (3) about the bit axis. In addition, an electro-acoustic converter (4) for producing ultrasonic vibrations and a vibration amplifier (5) are positioned within the housing for superimposing ultrasonic vibrations on the rotational action of the tool bit during operation on the manual tool.

25 Claims, 8 Drawing Sheets

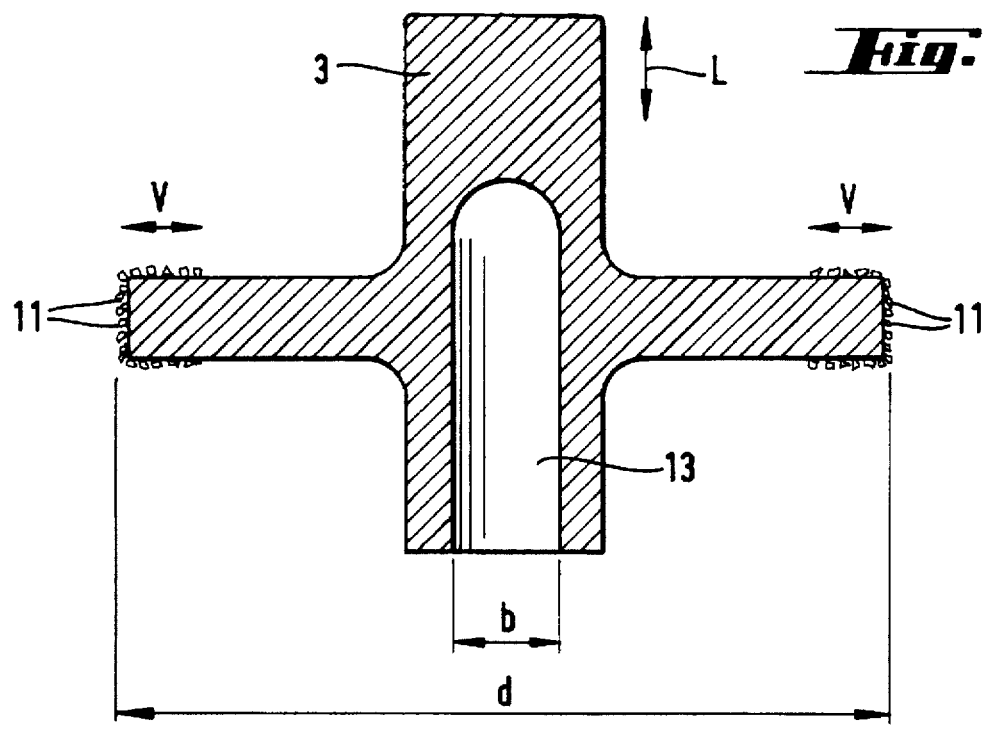
Fig. 6
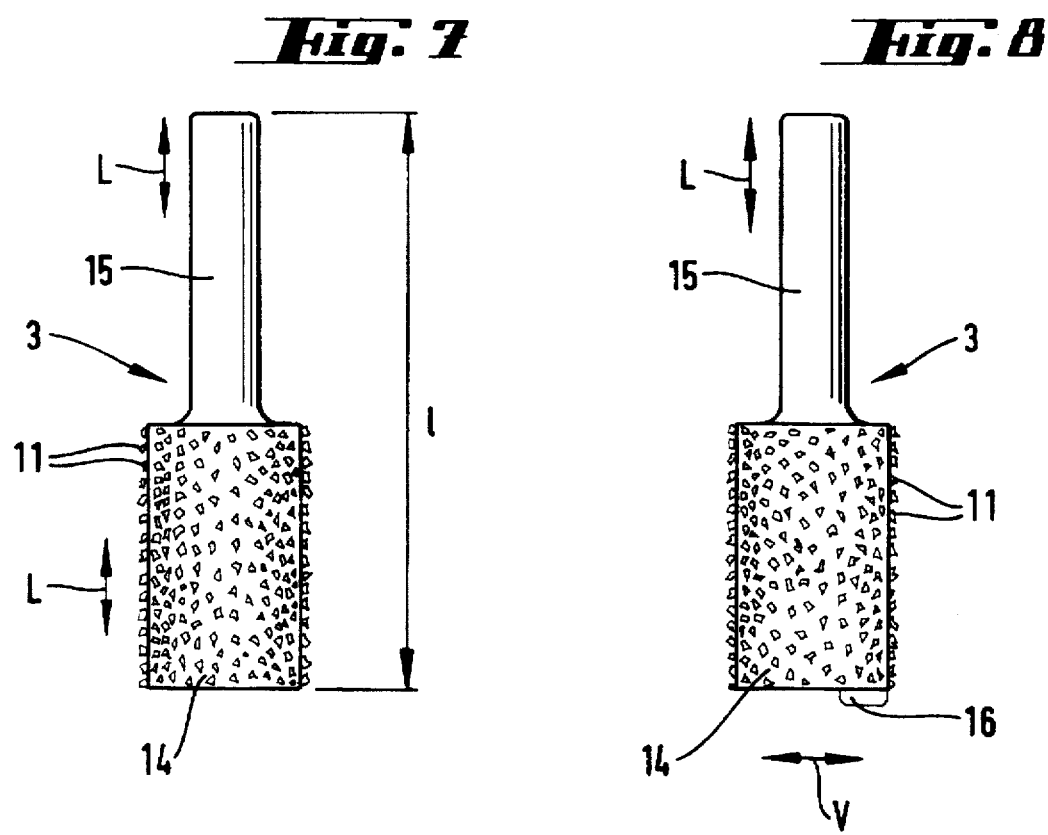
Fig. 7
Fig. 8

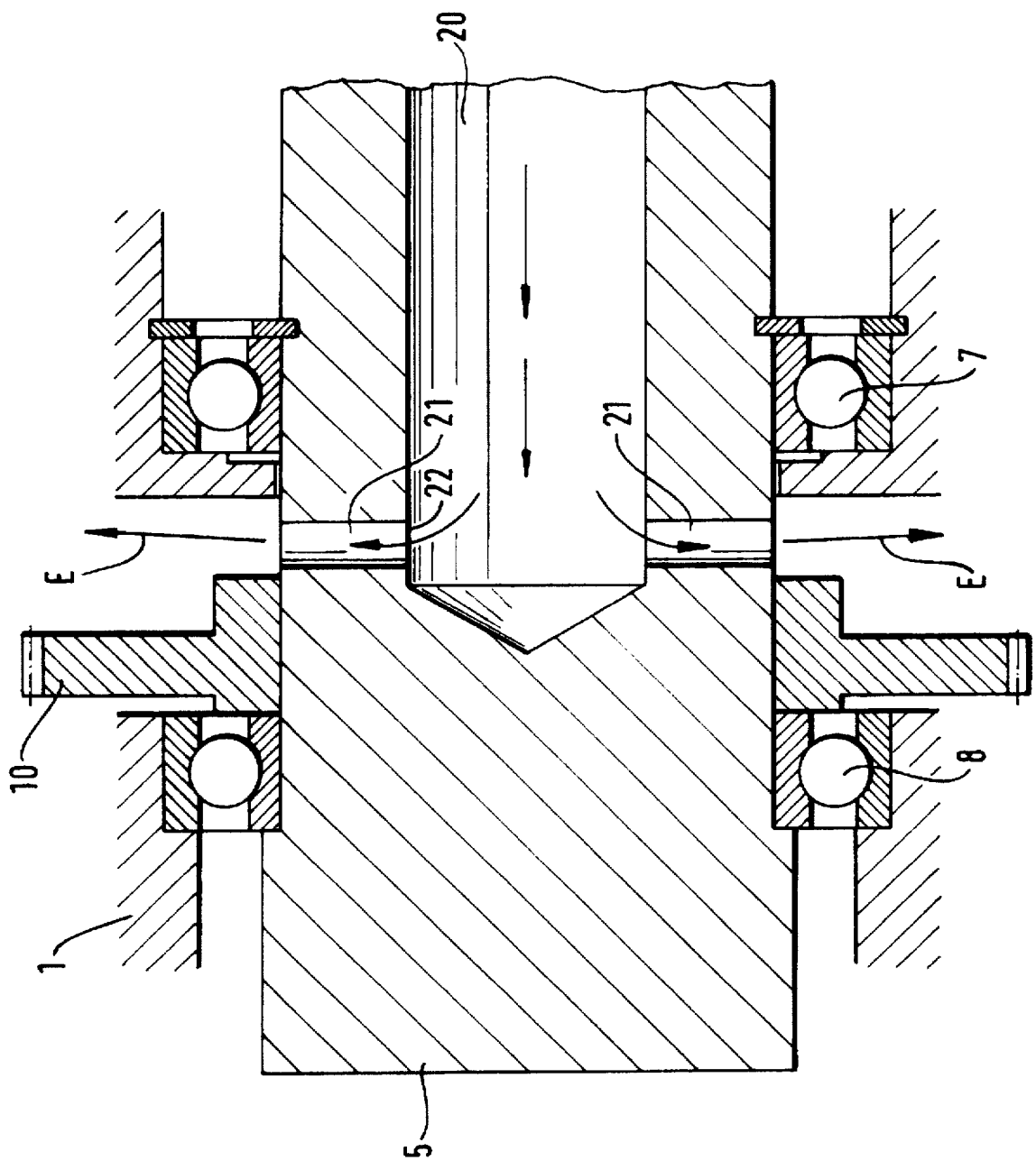

MANUAL TOOL FOR REMOVING MATERIAL FROM BRITTLE AND/OR NON-DUCTILE STOCK

BACKGROUND OF THE INVENTION

The present invention is directed to a manually operated tool for removing material from brittle and/or non-ductile stock where the tool comprises a housing, a drive unit located within the housing and an axially extending tool bit mounted in and extending outwardly from the housing and rotatable about its axis by the drive unit.

Often it is necessary in the construction industry in the installation of various electrical and mechanical equipment to work on the construction material, such as concrete, with or without reinforcing steel, wood, masonry and also metal for removing material to prepare openings or channels for various equipment and fittings, or recesses or depressions for plug-in sockets and many other items. Manually operated tools along with suitable tool bits are preferred for such work. Such manually operated tools are, for instance, manual core drilling devices, and manual tools for surface or slot machining as developed by the assignee and described in the assignee's product catalogue called "Systems Solutions for the Construction Industry 1994–1995," pages 92–95 and 111–113. While such manual tools have achieved a wide range of uses, and have proved themselves in providing high material removal rates, there still exists a desire for improvements.

In particular, it is desired to increase the material removal rate. At the same time, the contact pressure force provided by the tool user is to be reduced so that the range of application of the manual tools can be expanded. In addition, the noise and vibration strain on the user or operator caused by the manual tool is also to be reduced. The wear of the tool bits used in the manual tool, for instance, as caused by friction or chemical interaction between the cutting edge of the tool bit and the workpiece, is to be diminished. The heat load of the tool at the cutting edge is also to be reduced. Further, the useful life of the manual tool—tool bit combination is to be increased. The improved tool is to be capable of use in combination with appropriate tool bits for removing material from brittle stock as well as non-ductile stock, for instance, soft metals, such as aluminum, copper and the like. By improving the manual tool it should also be possible to further reduce the dust problems suffered by the operator caused when machining or working on such stock.

SUMMARY OF THE INVENTION

Therefore, the primary object of the present invention is to provide a manual tool of the general type mentioned above for effecting the listed improvements. These improvements are afforded by a manually operated tool for removing material from brittle and/or non-ductile stock, where the tool includes an electro-acoustic converter and a vibration amplifier located within the tool housing and arranged for superimposing ultrasonic vibrations on the rotational movement of the tool bit. The electro-acoustic converter and vibration amplifier are capable of superimposing the ultrasonic vibrations on the rotation of the tool bit during its operation. In this way, the abrasive or chip mechanism caused by the rotation of the tool is assisted by an additional removal mechanism in the form of direct blows by the machining tool bit. A considerable improvement in the removal rate, as compared to conventional removal methods without the use of ultrasonic assist, typically increases by a factor of 2 to 10. Such tools differ from conventional hammer drills operated according to the striker principle where the individual striking action through the tool bit is reduced and subsequently decays. A standing wave is maintained in the tool bit by the superimposition of ultrasonic vibrations and such energy is finally introduced into the material to be removed.

Another consequence of the ultrasonic assist is a notable reduction of the required contact pressure or force to be applied. This feature affords an expansion of the manual operation to certain fields where at the present time operation of stationery machine tools in a conventional manner is required. Since the friction is considerably reduced by the ultrasonic vibrations, lower temperatures are generated in the contact regions of the tool bit with the material to be removed. The reduction of friction results in a lower abrasion of the tool bit. At the same time the chemical interaction between the tool bit and the workpiece is reduced due to the lowered temperatures. This is also assisted by the effect of micro-hammering, since the period of contact of the tool bit with the stock or workpiece is reduced. Further, the contact region of the tool bit with the workpiece is work hardened and results in a longer useful life of the tool bit. The generation of ultrasonic waves and the shock effect of the tool produced by the ultrasonic waves produce only a very slight noise and vibration strain on the operator of the manual tool, which is clearly lower than the noise and vibration strain in conventional manual tools operated on the striker principle. Taking into account that the system is particularly sensitive in the region of one to two hundred hertz (HZ), it is immediately evident that vibrations in the ultrasonic range can be ignored.

The frequency and the amplitude of the ultrasonic wave is produced or matched to the cutting speed of the tool bit and preferably adjusted in such a way that the following formula applies:

$$0.5 \cdot V > \omega \cdot 2 \cdot a > 5 \cdot V$$

Where the symbol $\omega$ is the angular frequency, a is the amplitude of the ultrasonic vibrations, and v is expressed in meters per second and represents the cutting speed of the tool bit in the stock to be removed. In this way it is assured that the travel of the contact region of the tool bit relative to the stock being removed is of an order of magnitude between two blows of the tool bit, which favors the effect of micro-chiseling or micro-cutting.

Preferably, an electro-acoustic converter is selected having an ultrasonic output in the range of approximately 100 watts to 1000 watts and, more particularly, in the range of approximately 200 watts to approximately 500 watts. Electro-acoustic converters of this output class have a properly proportioned ratio of output to weight and size and can be easily housed in a manual tool of the conventional dimensions. Magnetostrictive or piezoelectric converters are particularly preferred, since they are available in the required output ranges, they are reliable and largely insensitive to the type of handling which is found at construction sites.

Preferably, the tool bit is secured in a tool bit chuck which is generally arranged in the region of the vibration node of the ultrasonic vibrations produced. In these regions the energy of the ultrasonic vibrations produced is largely available in the form of potential kinetic energy. Accordingly, in such a region the tool bit is largely decoupled from vibration nodes. The jointing points of the individual components of the electro-acoustic converter and the vibration amplifier are preferably disposed in regions of vibration nodes of the ultrasonic vibrations produced. Just as in the case of tool bit chucks, the same applies here, mainly that the energy of the ultrasonic vibrations is largely available as potential energy in such regions, so that the jointing points are not exposed to any axially or laterally directed loads which could result in undesirable movements of the individual components relative to one another.

The axial length of the tool bits to be secured to the manual tool are preferably dimensioned so that a vibration antinode or a maximum amplitude of the ultrasonic vibration produced comes to rest in the region of contact with the material being worked on. In this way the energy of the ultrasonic vibration is essentially present only in the form of kinetic energy and can be used for the blow or shock type machining of the stock in the region of the tool bit contacting the material to be removed.

Preferably, materials having a low damping of ultrasonic vibrations are used as the material for the tool bit. Preferably, a heat treated carbon steel or an aluminum or titanium alloy is used, since such materials have the required strength apart from the low damping properties of ultrasonic vibrations.

The superimposed rotational and transitional motion of the tool bit is preferably realized by rotatably supporting the vibration amplifier within the housing so that it rotates around its axis driven by an electrical drive means. In this arrangement, the tool bit chuck is provided at the vibration amplifier. In this way, the energy of the ultrasonic vibration can be coupled directly from the vibration amplifier into the tool bit. There are no intermediate parts which could cause energy losses.

In a preferred embodiment of the invention, the electro-acoustic converter is designed to produce longitudinal or axially directed ultrasonic vibration of a wave length in the range of approximately 10 to 40 centimeters. Such a selection of the wave length permits utilization of tool bits having a construction length adapted for manual applications. Overall construction length of the manual tool including the tool bit should be at least three times that of half the wave length of the ultrasonic vibration produced. The maximum overall length of the manual tool embodying the invention should not exceed 10 times $\lambda/2$.

A preferred embodiment of the manual tool for use in connection with the axially directed ultrasonic vibrations is a tubular or rod-shaped tool bit having a length of $n \lambda/2$ where n equals 1, 2, 3, . . . , with the tool bit equipped with cutting members at its leading end. The tool bit experiences axially directed vibrations during operation which act in the direction of the contact pressure force. A manual tool embodying the invention with such a tool bit can, for instance, be used in place of a conventional hammer drill. The electro-acoustic converter for axially directed ultrasonic vibrations is used here in place of an electro-pneumatic striker mechanism. Tools equipped with the invention can be used especially for producing penetrations in masonry. At the present time there is a separate line of tools for such use in connection with annular tool bits. Viewed in the cutting direction, recesses are provided in the leading end of the tool bit upstream of each cutting member for cutting non-ductile materials. In this way, the axially directed ultrasonic vibrations introduced into the tool bit can be redirected in the direction of the cutting force in order to achieve a vibration assist in the direction of the contact pressure force as well as in the direction of the cutting force. This reduces the required contact pressure force.

By equipping a tubular shaped tool bit with cutting members with asymmetric projections at the leading end of the tool bit, the axially directed ultrasonic vibrations, can, when the tool bit is rotating, be redirected approximately radially outwardly from the leading end. In this way, a flushing effect can be improved especially with annular drill bits equipped with cutting segments.

A preferred disc shaped tool bit with an external diameter is equipped at its circumference and around its outer side edge regions with cutting members. Its axial dimension amounts to n $\lambda/2$ where n=1, 2, 3. The disc-shaped tool bit has an axial bore with a specific diameter in its central region and the tool bit has an average diameter which is designated as half the sum of the external diameter of the tool bit and the internal diameter of the axial bore. Preferably, the tool bit is tuned to a radial natural frequency of the disc shaped tool bit according to the equation:

$$f_r = C_L / D_M \pi$$

in which $f_r$ designates the radio natural frequency, $C_1$ designates the axial velocity of sound in the tool bit, and $D_m$ stands for the average diameter of the disc-shaped tool bit. In this manner the axially introduced ultrasonic waves are redirected by transverse contraction into radially directed ultrasonic waves. Thereby the vibration of the tool bit used for machining a slot or recess occurs again in the direction of the contact pressure force. The RPM of the disc-shaped tool can be noticeably reduced, for instance in the order of twice the magnitude, by the ultrasonically assisted work on the material to be removed, and this increases the working safety and reduces the emission of noise.

A finger-shaped grinding tool bit has an approximately cylindrically-shaped appearance. The external surface of the cylinder is covered with grinding members for working in slots. Its axial length amounts to an integer multiple of half the wave length of the introduced ultrasonic vibrations. The vibrations of the tool bit occur laterally to the cutting direction which, among other things, also facilitates the flushing action. In addition, the rotational speed of the tool bit can be significantly reduced due to the ultrasonic assist which increases the working safety and reduces noise emissions. In an embodiment of the tool bit, the ultrasonic vibrations are converted into a bending mode of the tool bit. This occurs by disposing a small eccentric mass at the leading end of the tool bit. This causes a vibration in the direction of the contact pressure force whereby the required contact pressure force is reduced.

A preferred tool bit is a grinding tool bit in the shape of a pot or planar disc equipped with grinding members in its region coming into contact with the material to be worked. The axial extent or reach of the tool bit amounts to n $\lambda/2$ where n=1, 2, 3 . . . , the diameter is an integer multiple of half the wave length of the bending vibrations, which are excited in the disc shaped grinding tool bit by the axially directed ultrasonic vibrations. The vibration of the tool bit takes place in a direction of the contact pressure force which can be reduced accordingly. The RPM of the tool bit can be notably reduced due to the ultrasonic assist. Further, it also reduces the frictional heat. In addition, the induced bending waves assist also in the flushing operation. The cutting velocity of the tool bit increases with the radius. To further increase the effect of the micro-chiseling or cutting, the edges of the disc-shaped tool bit are designed to be thicker or thinner than in the remaining regions of the disc. In this way, the amplitude of the induced bending vibration is increased which has a direct favorable effect on micro chiselling or micro cutting operation.

A roll-shaped grinding tool bit with an axially extending grinding surface has grinding members at its circumference and is another preferred tool bit for use in a manual tool with the superimposition of axially directed ultrasonic vibrations.

The axial extent of the tool bit amounts to n λ/2 where n=1, 2, 3 ... The tool bit has an axial bore of a specific diameter, wherein the tool bit comprises an average diameter of half the sum of the external diameter of the tool bit and the internal diameter of the axial bore. It is tuned to a radio natural frequency of the roll-shaped tool bit according to the equation:

$$f_r = C_L / D_M \pi$$

where $f_r$ is the radial resonant or natural frequency, $C_L$ is the axial speed of sound in the tool bit, and $D_M$ is the average diameter of the roll-shaped tool bit. The initiated axially directed ultrasonic vibration in such a tool bit is converted at the vibration nodes into radial waves by lateral contractions. The vibration of the tool bit takes place in the direction of the contact pressure force. This force can thereby be reduced or a higher removal rate can be achieved with the same contact pressure force. The RPM of the tool bit can be noticeably reduced by the ultrasonic assist, which increases the working safety and diminishes noise emissions. For larger removal rates, two or more such tool bits are arranged consecutively in a preferred manner.

In another embodiment of the invention, the manual tool for removing material in brittle and/or non-ductile stock, the electro-acoustic converter is configured for producing ultrasonic torsional vibrations. The wave length λ of the torsional vibrations generated in the ultrasonic region amounts to approximately 10 to 40 centimeters. By the selection of such a wave length, it is possible to utilize tool bits with an effective length for manual applications. The overall construction length of the manual tool including the tool bit should amount to at least three times half the ultrasonic vibrations produced. The maximum overall length of the manual tool embodying the invention should not exceed ten times λ/2.

Another preferred tool bit, assisted in operation by ultrasonic torsional vibrations, is a tubular or rod-shaped tool bit having a length of nλ/2 where n=1, 2, 3 ..., and is equipped with cutting members on its leading end. In this manner, the ultrasonic assist takes place in the direction of the cutting force and it is assured, due to the selected length of the tool bit, that the energy of the ultrasonic vibration is essentially present as kinetic energy in the region of the tool bit in contact with the stock to be removed. The tool bit designed in such a way in connection with ultrasonic torsional vibrations produced by the manual tool is suitable for working non-ductile stock such as, composite aluminum material and also brittle stock, where the removal rate is noticeably increased due to the ultrasonic assist in the direction of the cutting force.

In a preferred tool bit, recesses or depressions are provided behind each cutting member viewed in the cutting direction. In this way, torsional vibrations can be redirected in such a way, that apart from the vibrations in the direction of the cutting force, there is also a vibration assist in the direction of the contact pressure force. The required contact pressure force is noticeably reduced in tool bits designed in this way.

In such shaped tool bits, equipped with cutting members at the circumference and at the outer edge regions, such as used for working in slots, the axial extent of the tool bit amounts to n λ/2 where n=1, 2, 3, .... By initiating the torsional waves, an assistance in the direction of the cutting force occurs which permits a reduction in the number of revolutions of the disk shaped tool bit while maintaining an equally good removal rate, and increases the working safety and reduces noise emissions. In an especially preferred embodiment of the disk shaped tool bit, the maximum disk diameter amounts to approximately four times the diameter of the shaft carrying the disk. In the case of such diameter relationships, the ultrasonic assist of the removal outlet of the tool bit is especially good.

In a preferred embodiment of the manual tool containing the invention, the vibration amplifier is provided with an axial bore into which radial suction or aspiration channels discharge. The outlets of the suction channels are disposed essentially in the region of the vibration nodes of the ultrasonic vibrations generated during operation. A vacuum cleaner can be connected to the suction channels. This affords the ability to carry away the drilled fines to the outside tool. In another embodiment a suction module is disposed upstream of the vibration amplifier and the module has a length of nλ/2 where n equals 1, 2, 3 ..., preferably a length of λ/2. The suction module is provided with an axial bore into which radial suction channels discharge. The mouth area of the suction channels are positioned essentially in the region of the vibration nodes of the ultrasonic vibrations produced during operation. A vacuum cleaner can be connected to the suction channels.

BRIEF DESCRIPTION OF THE DRAWINGS

In the drawings:

FIG. 6 is an axially extending sectional view of yet another embodiment of a tool bit usable in the manual tool displayed in FIG. 1;

FIG. 7 is an elevational view of a familiar embodiment of a tool bit usable in the manual tool illustrated in FIG. 1;

FIG. 8 is an elevational view of another embodiment of the tool bit set forth in FIG. 7;

FIG. 19 is an axially extending sectional view of a vibration amplifier with a suction arrangement.

DETAILED DESCRIPTION OF THE INVENTION

Figure 1:
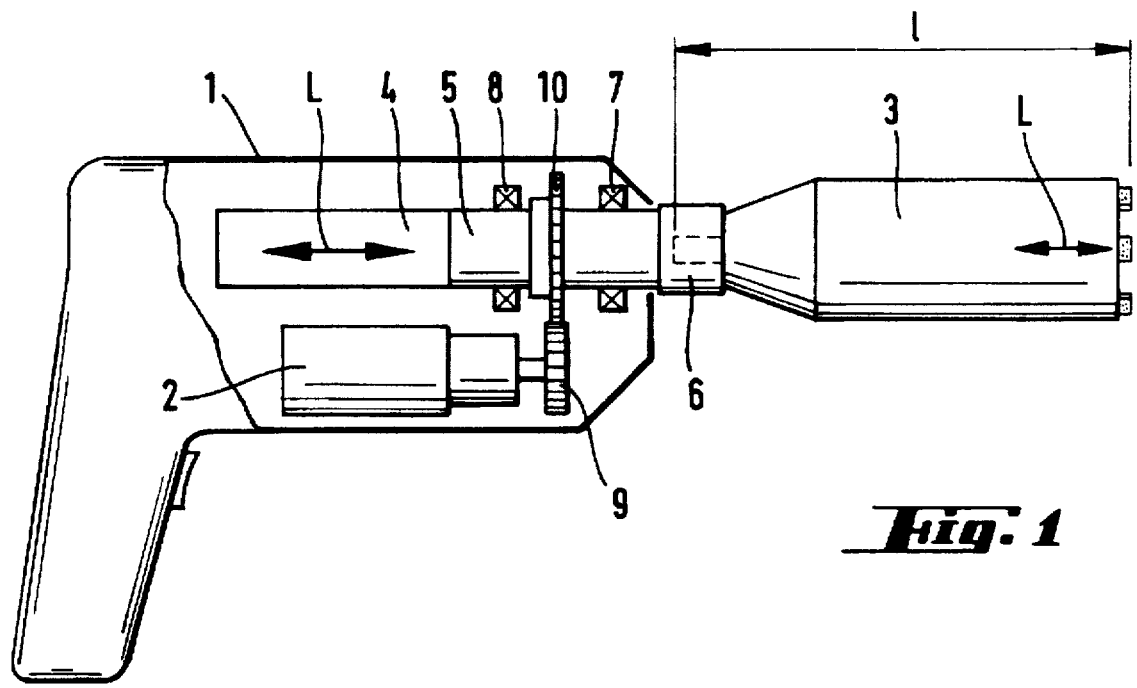
FIG. 1 is a side elevation view of a manual tool embodying the present invention and arranged for provided axially directed ultrasonic vibrations into a tool bit clamped in the tool.

A manual tool for removing material from a brittle and/or non-ductile stock is shown in FIG. 1 and comprises a housing 1 containing a drive unit 2 for a tool bit 3 secured in the manual tool. In operation, the tool bit 3 is rotated about its axis by the drive unit for removing material from the stock. An electro-acoustic converter 4 for producing ultrasonic vibrations and a vibration amplifier 5 are located within the housing 1. When the manual tool is operated, ultrasonic vibrations are superimposed upon the rotation of the tool bit 3. Preferably, the electro-acoustic converter 4 and the vibration amplifier 5 are disposed in axial alignment with the tool bit 3. Accordingly, the generated ultrasonic vibrations can be directly coupled into the tool bit and no redirection devices for the vibrations are required, which could result in vibration energy losses.

The axial length of the individual parts of the electro-acoustic converter 4 and the vibration amplifier 5 are chosen in such a way that the jointing points between them are disposed in the regions of the vibration nodes of the generated ultrasonic vibrations. The tool bit is retained in a tool bit chuck 6, preferably located in the region of a vibration node of the generated ultrasonic vibrations. The vibration energy is present as potential energy in the vibration nodes of ultrasonic vibrations, therefore, the elements or parts located there are subjected only to a slight mechanical load.

Figure 13:
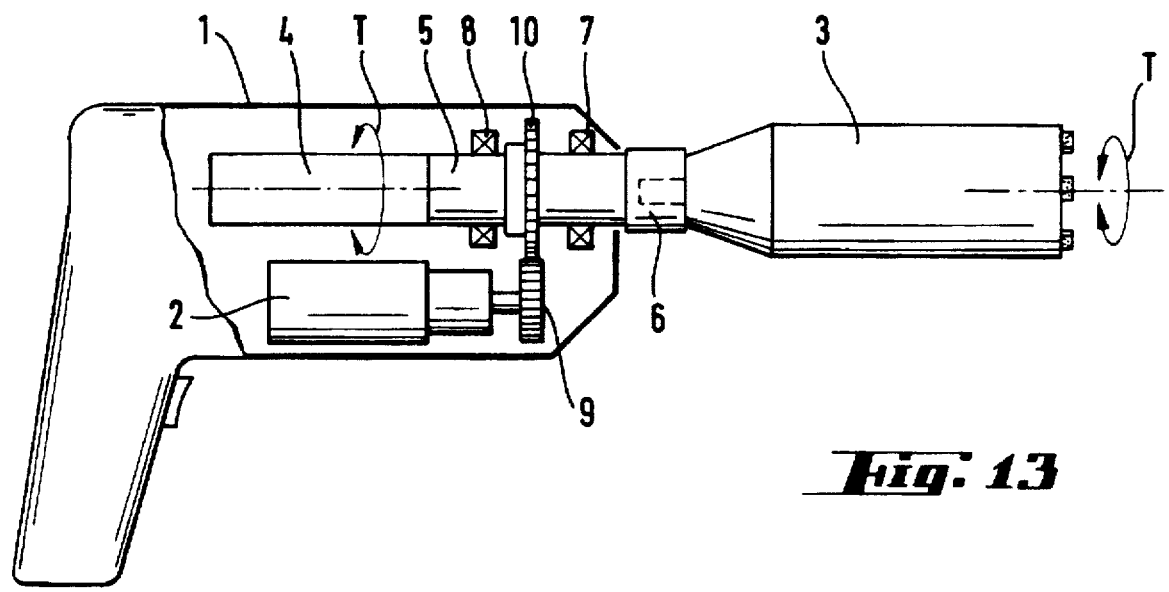
FIG. 13 is another embodiment of a manual tool embodying the present invention for directing torsional ultrasonic vibrations into a tool bit clamped in the tool.

As shown, the drive unit 2 can be housed below the electro-acoustic vibration converter 4 and the vibration amplifier 5, however, it could also be located in the handle of the housing 1. In the embodiment of the manual tool shown in FIG. 1, the vibration amplifier 5 is supported so that it is rotatable, as indicated by the bearings 7, 8. A drive pinion 9 extending from one end of the drive unit 2 is shown diagrammatically and meshes with a circumferential set of teeth 10 on the vibration amplifier 5 and imparts axial rotation in operation. The support of the vibration amplifier 5 is preferably arranged in the region of the vibration nodes of the ultrasonic vibrations produced, in order to keep the mechanical loads as low as possible. The tool bit chuck 6 is located directly at the front or leading end of vibration amplifier 5. It can be designed as a separate part, however, it is preferable if it is integrated with the vibration amplifier 5. The electo-acoustic converter 4 is connected to the vibration amplifier 5 so that it does not rotate relative to it. Magnetostrictive and piezoelectric converters are utilized as the electro-acoustic converters. The ultrasonic output of the electro-acoustic converter 4 is approximately in the range of 100 to 1,000 watts, preferably between approximately 200 and 500 watts. The electro-acoustic converter 4 can be a converter for producing axially directed ultrasonic vibrations, as is indicated in FIG. 1 by the twin arrow L. However, it can also be a converter for producing ultrasonic torsion vibrations. As indicated in FIG. 13 by the twin arrow T, torsional vibrations are provided by the tool.

The operation and the cutting material removal mechanism caused by the rotation of the tool bit is assisted by an additional working mechanism in the of a direct blow of the tool bit caused by the superimposition of the ultrasonic waves. As a result, the rate of material removal increases considerably, typically by a factor of 2–10 as compared to conventional machining methods without ultrasonic assist. As distinguished from conventional hammer drill tools operating according to the striker principle, where individual strain waves travel to the tool bit and then decay, a standing wave is maintained in the tool bit through the superimposition of ultrasonic waves, whose energy is introduced into the stock to be removed. In tool bits with defined cutting edges, for instance, carbide cutting edges or polycrystalline cutting edges (PKD), the penetrating depth of the cutting edge engaging the stock from which material is to be removed is increased by the ultrasonic assist. To obtain a comparable penetrating depth when cutting or drilling without ultrasonic assist as compared to the contact pressure force when operating without ultrasonic assist, the contact pressure force can be reduced. Wear at the cutting edge is noticeably reduced for comparable penetration depths. As a result, cutting edges of lower hardness can be effected and this directly limits the cost of the tool bits. Where undefined cutting edges are present, such as cutting segments formed of carbide material or diamond grains in grinding layers, the heat generated in the course of material removal is reduced due to the ultrasonic assist. Such an effect expands the range of dry applications of manual tools. The required contact pressure forces are clearly reduced as a result. The self-sharpening of cutting segments is assisted and takes place also at small contact pressure forces. All this results in increasing the useful life of the tool bit and of the manual tool which are exposed to a lower mechanical load due to the ultrasonic assist. In the tool bits shown in FIGS. 1–12, we are dealing with tool bits used in manual tools equipped for axially directed ultrasonic vibrations. The manual tool illustrated in FIG. 1 has an electro-acoustic converter 4 arranged for producing ultrasonic vibrations with a wavelength $\lambda$ of 2 to 20 centimeters. The illustrated tool bit 3 can be used in place of a rod or tubular shaped tool bit equipped with cutting members 11 at its leading edge. Such tool bits or drills, crown drills or hollow drills are used for cutting brittle materials. The length of the tool bit is n $\lambda/2$ where n equals 1,2,3 .... The tool bit is tuned acoustically which establishes the system linkage. In actual operation, the tool bit affords axially directed vibrations in addition to rotation of the bit. The ultrasonic assist of the material removing operation occurs in the direction of the pressure contact force.

Figure 2:
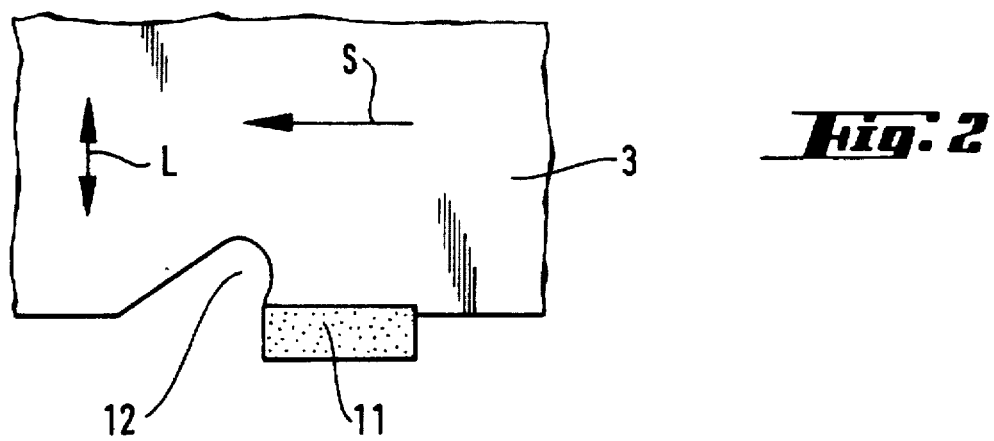
FIG. 2 is a partial side elevation view of a tool bit as shown in FIG. 1.
Figure 3:
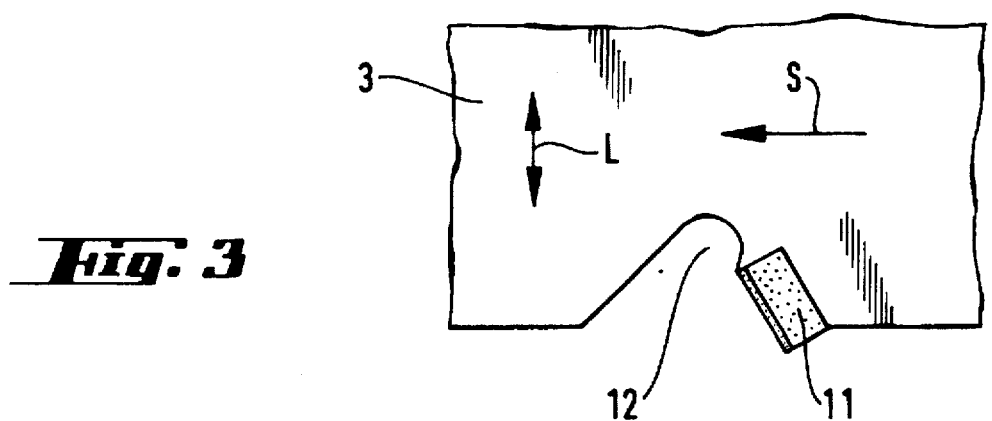
FIG. 3 is a partial side elevational view of another embodiment of the tool bit displayed in FIG. 2.

For working on non-ductile materials using a small contact pressure force, vibrations of the tool bit in the direction of the contact pressure force and of the cutting force are desirable. For this purpose, as shown in FIGS. 2 and 3, each cutting member 11 has a recess 12 immediately ahead of it in the cutting direction, as indicated by the arrow S. As a result, a part of the axially directed vibrations introduced into the tool bit are redirected in the direction of the cutting force. The cutting members 11 in FIGS. 2 and 3 differ in that in FIG. 2 a cutting segment of carbide metal extends approximately parallel to the leading end of the tool bit that is, to the cutting direction. In FIG. 3, the cutting member 11 is formed of a polycrystalline cutting edge, and is oriented at an angle to the cutting direction, that is to the front or leading end of the tool bit.

Figure 4:
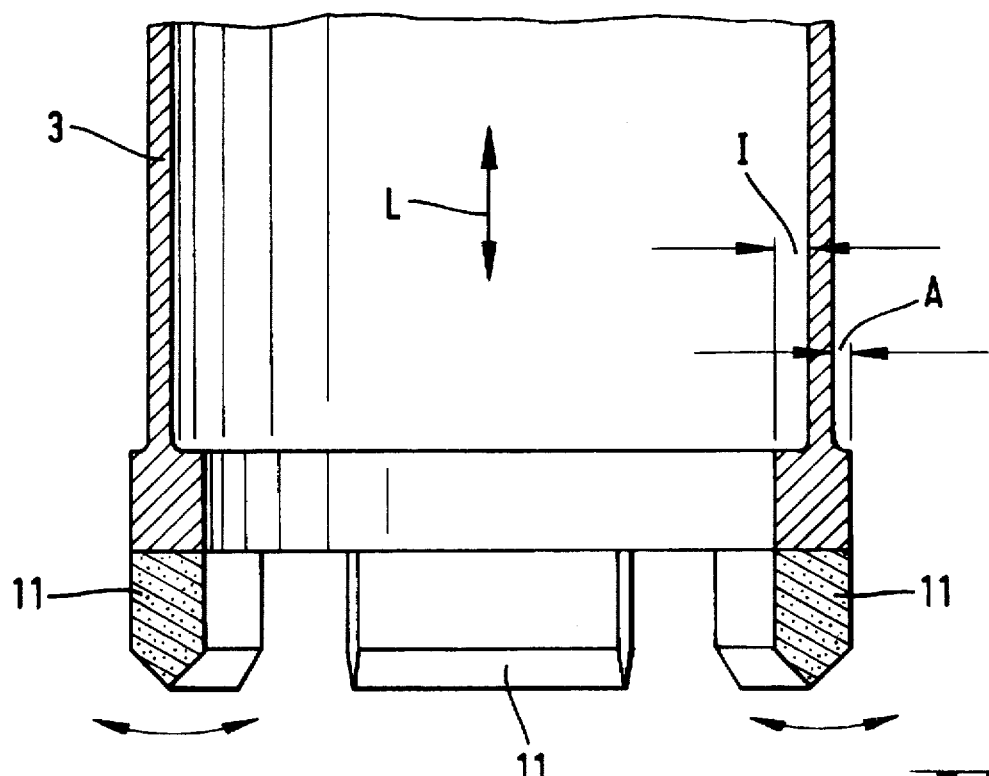
FIG. 4 is a partial elevation view partly in section, of still another embodiment of the tool bit illustrated in FIG. 1.

It may also be desirable to incite additional vibrations of the tool bit extending perpendicularly to the cutting direction. As shown in FIG. 4, this is achieved by the asymmetrical arrangement of the cutting members 11 at the leading end of a tubular shaped bit, for instance, an annular or hollow drill bit. At its leading end, the drill bit projects outwardly and inwardly so that the outward projection A is less than the inward projection I. This asymmetrical arrangement causes a pumping motion when the tool bit is rotated which improves the flushing or rinsing effect of boring crowns or hollow drill bits.

Figure 5:
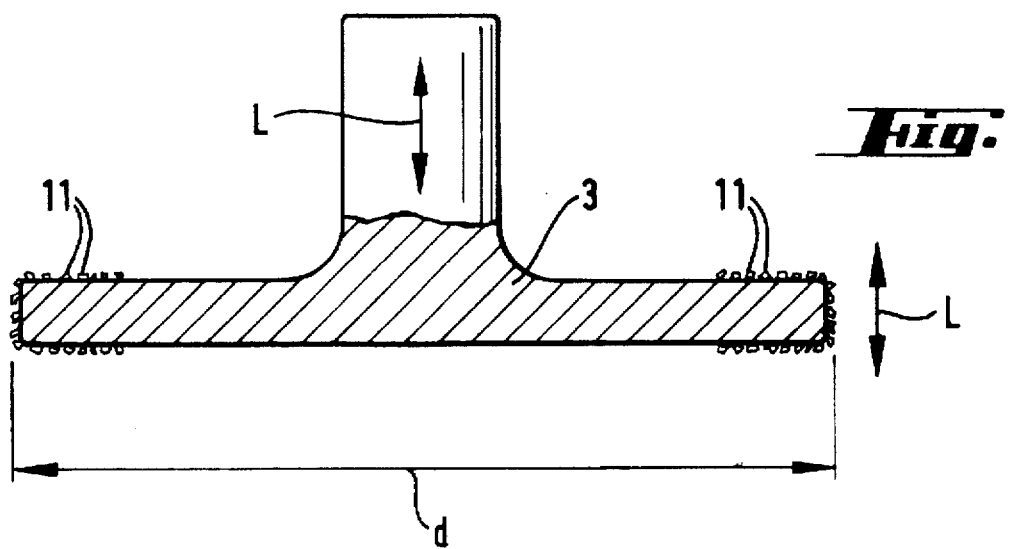
FIG. 5 is an elevational view, partly in section, of another embodiment of a tool bit usable in the manual tool shown in FIG. 1.

The disk shaped tool bit 3 displayed in FIG. 5 has cutting members with undefined cutting edges, that is, grains or splintered carbide metal or diamond grains at the circumference and at the outer side edges of the disk shaped bit. Such tool bits are used for working in slots. The introduced axially directed vibrations L excite a bending mode on the disk. The disk is tuned in the axial direction to an integer multiple of $\lambda/2$ of the axially directed mode of the introduced ultrasonic vibrations. The disk diameter d amounts to an integer multiple of half the wavelength of the excited bending mode. The vibration of the tool bit is performed laterally to the cutting direction and it facilitates the rinsing or flushing action.

In FIG. 6 the tool bit 3 is a disk shaped bit. It has an external diameter d as well as cutting members 11 with undefined cutting edges located at its circumference and at both of its outer side edges. Its axial extent amounts to n $\lambda/2$ with n equaling 1, 2, 3. The disk shaped tool bit has an axial bore 13 with a diameter b in its central region, wherein the tool bit has an average diameter defined as half the sum of the external diameter d and of the internal diameter b. Preferably, the tool bit is tuned to a radial natural frequency of the disk shaped tool bit according to the equation:

$$f_r = C_L / D_M \pi$$

wherein $f_r$ is the radial natural or resonant frequency, $C_L$ is the axial speed of sound in the tool bit, and $D_M$ is the average diameter of the disk shaped tool bit. Accordingly, the axially introduced ultrasonic wave L is redirected into a radial ultrasonic wave V through lateral contraction. Accordingly, the vibration of the tool bit 3 used for working in a slot acts again in a direction of the contact pressure force.

A finger shaped tool bit 3 for working in slots is shown in FIGS. 7 and 8. The tool bit 3 has a stem-shaped insertion end 15 and a larger diameter cylindrical body 14 with the outer surface of the cylindrical body covered with cutting members 11 with undefined cutting edges. The axial length 1 of the tool bit is tuned to the axially directed vibrations of $\lambda/2$. The vibrations of the tool bit are effected laterally of the cutting direction and such action facilitates rinsing or flushing of the cutting region. In the finger shaped tool bit 3 shown in FIG. 8 an eccentric mass 16 of approximately 1 to 30 grams is disposed at the leading end of the tool bit. The axially directed vibrations are converted to a bending mode by the small eccentric mass 16. The vibration of the tool bit thus occurs in the direction of the contact pressure.

Figure 9:
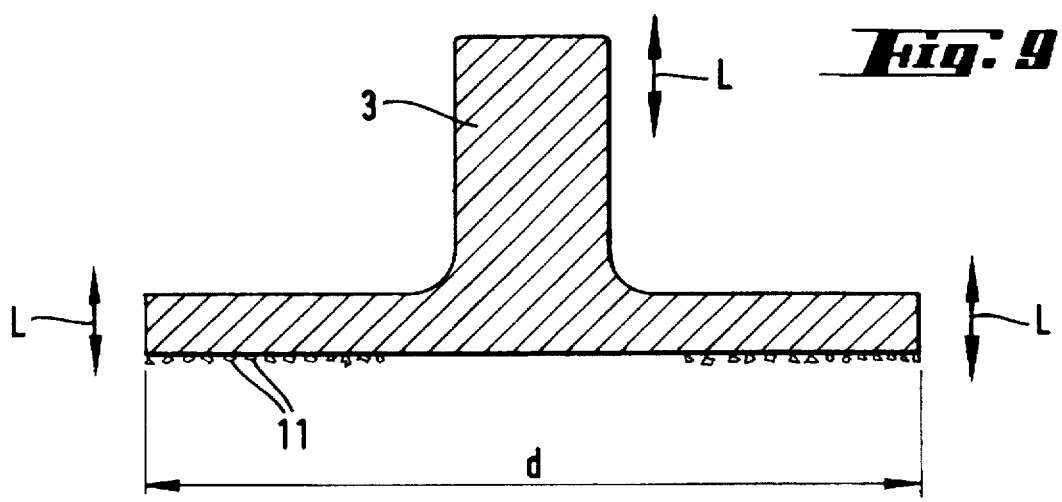
FIG. 9 is an axially extending sectional view of another embodiment of a tool bit, similar to the tool bit in FIG. 5, usable in the manual tool of FIG. 1.
Figure 10:
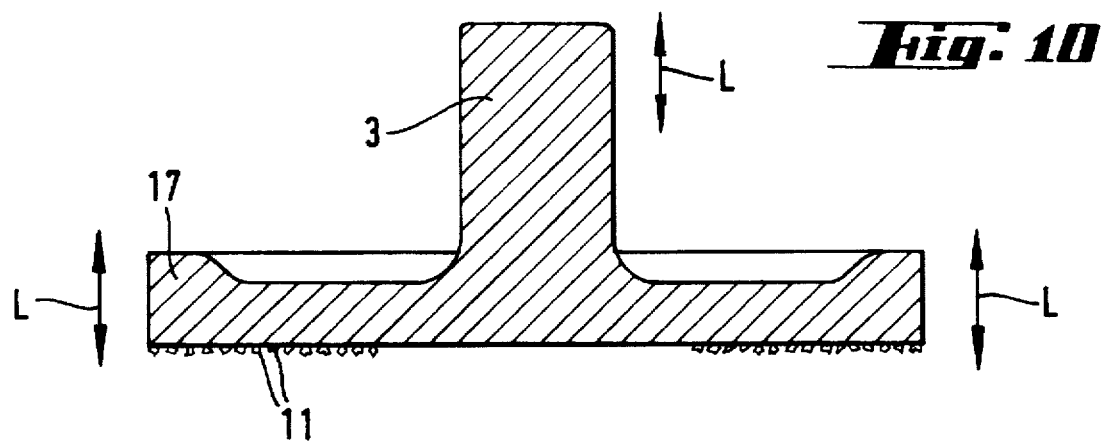
FIG. 10 is an axially extending sectional view of a further embodiment of a tool bit usable in the manual tool of FIG. 1 and similar to the tool bit shown in FIG. 9.
Figure 11:
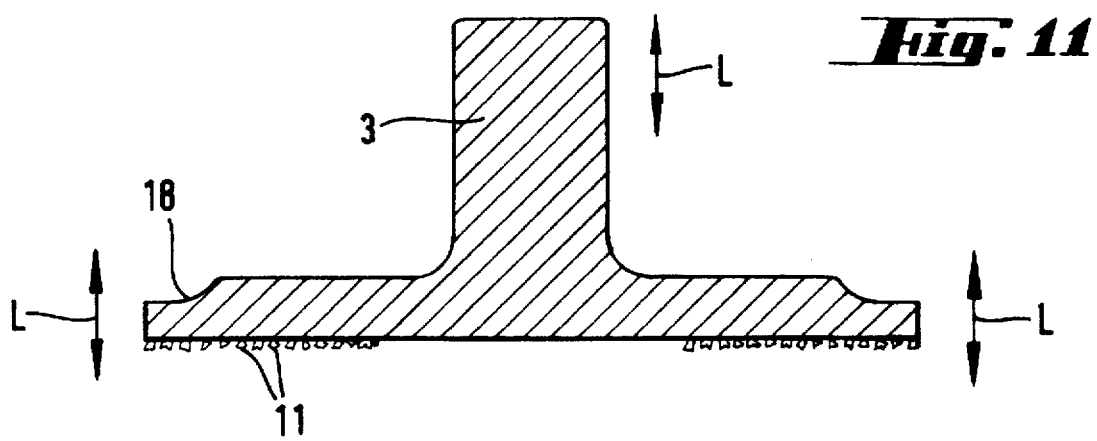
FIG. 11 is an axially extending sectional view of a still further embodiment of a tool bit usable in the manual tool of FIG. 1 and similar to the tool bits in FIGS. 9 and 10.

The tool bits 3 shown in FIGS. 9–11 are grinding tool bits in the form of planar or pot shaped disks. Cutting members 11 with undefined cutting edges are disposed in the region of the disk contacting the material to be removed. The introduced axially directed vibrations excite a bending mode on the disk. The vibration of the tool bit 3 is performed in the direction of the contact pressure force. The tool bit has an axial length of n $\lambda/2$ where n equals 1, 2, 3 ..., the diameter d amounts to an integer multiple of half the wavelength of the bending mode excited in the disk. The amplitude of the bending waves can be further increased by shaping the edge regions of the disk to be thicker 17, as indicated in FIG. 10 or to be flattened and thinner, as indicated at 18 in FIG. 11.

Figure 12:
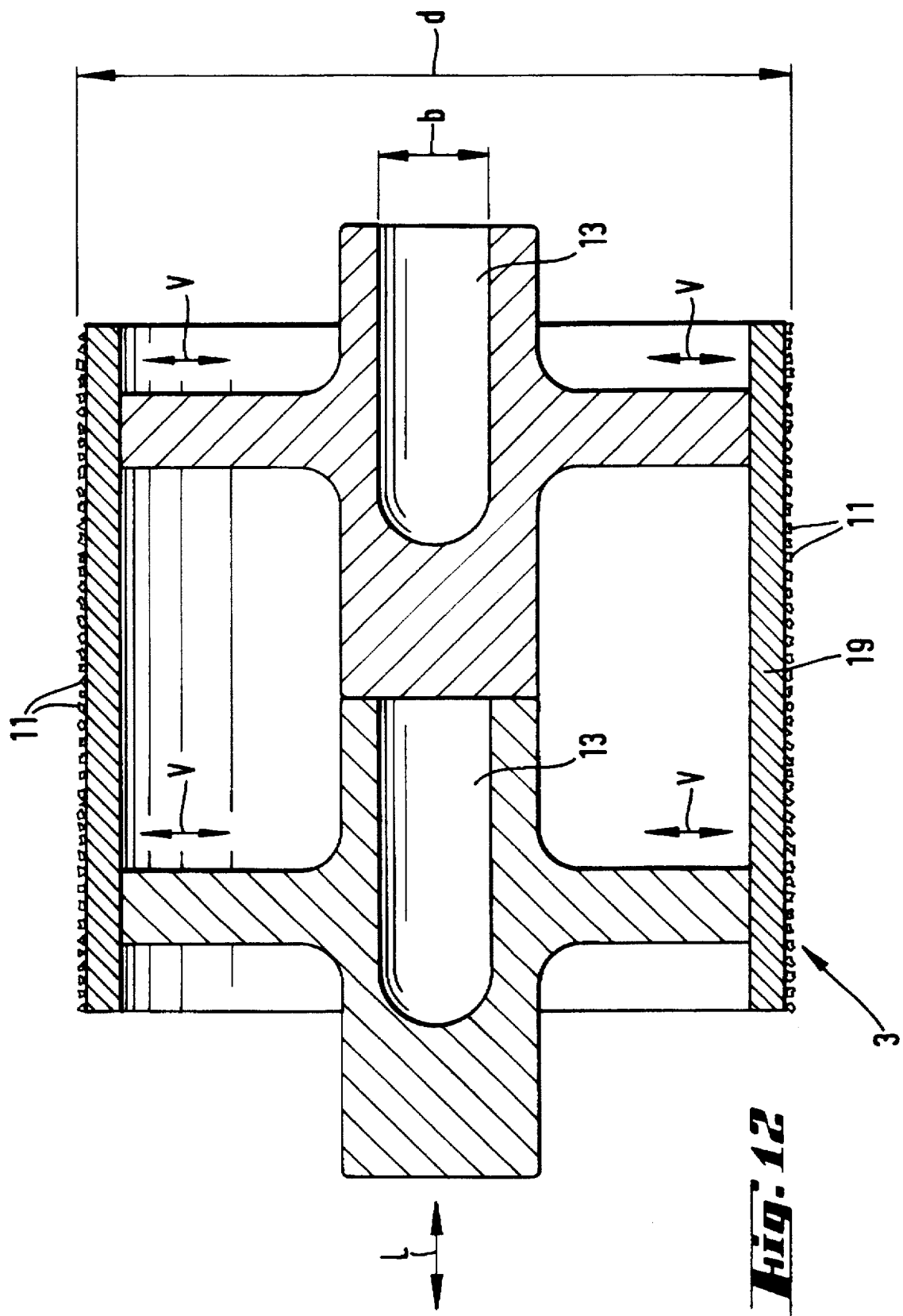
FIG. 12 is an axially extending sectional view of yet another embodiment of a tool bit usable in the manual tool of FIG. 1.

A roll-shaped grinding tool bit 3, for surface grinding, is shown in axial section in FIG. 12. An axially extending grinding surface 19 extends around the circumference of the tool bit and has undefined cutting edges arranged around its circumference. The axial extent of the tool bit amounts to n $\lambda/2$ where n equals 1, 2, 3 .... The tool bit has an axial bore 13 with a diameter b. The roll-shaped tool bit has an external diameter d. An average diameter of the tool bit is defined as half the sum of the external diameter d and the internal diameter b and is tuned to a radial natural resonant frequency of the roll-shaped tool according to the equation:

$$f_r = C_L D_M \pi$$

wherein $f_r$ is a radial resonant or natural frequency, $C_L$ is the axial speed of sound in the tool bit, and $D_m$ is the average diameter of the roll-shaped tool bit 3. In the tool bit 3, the introduced axially directed ultrasonic vibration is converted at the vibration nodes into radial waves V by lateral contraction. Vibration of the tool bit takes place again in the direction of the contact pressure force. As shown in the illustrated embodiment, preferably two or more such tool bits are consecutively disposed for larger removal widths.

In FIG. 13 a manual tool is shown diagrammatically and its construction is largely the same as the tool shown in FIG. 1. The difference between the two is that the electro-acoustic converter 4 is arranged for producing ultrasonic torsional waves of a wave length $\lambda$ of approximately 5–20 centimeters. The tubular shaped tool bit 3 shown inserted into the tool in FIG. 13 is attuned acoustically to the introduced torsional waves, its axial extent amounts to n $\lambda/2$ where n=1, 2, 3 ..., whereby the system linkage is defined. In operation, the tool bit performs torsional vibrations in the cutting direction. The tool bit itself is preferably equipped with polycrystalline diamond cutting edges or diamond grains.

Figure 14:
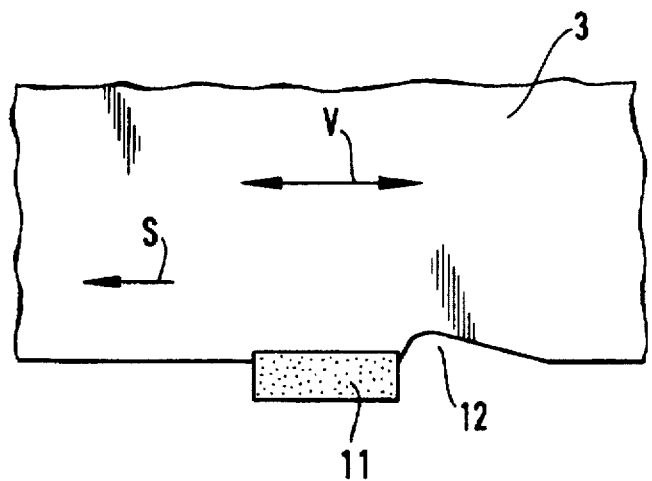
FIG. 14 is a partial side elevational view of a tool bit as shown in FIG. 13.
Figure 15:
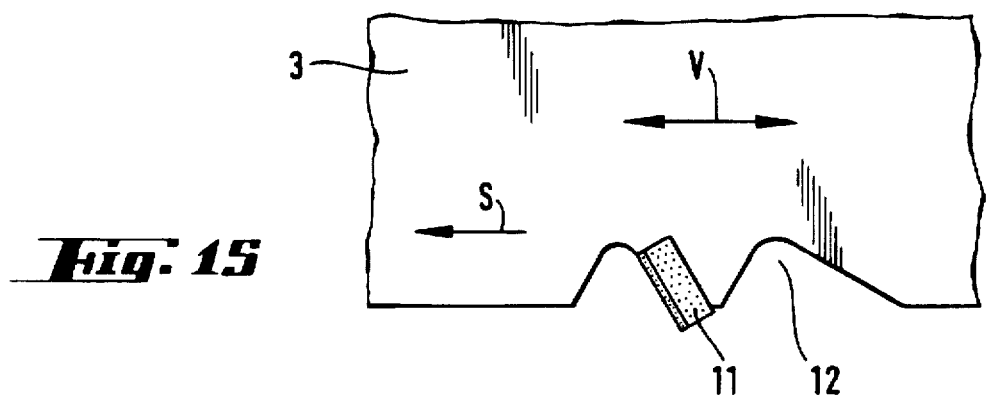
FIG. 15 is a partial side elevational view of another embodiment of the tool bit set forth in FIG. 14.

In the event vibration assist is desired in the direction of the cutting forces as well as in the direction of the contact pressure force, recesses 12 are provided at the trailing end of the cutting members 11 relative to the cutting directions as indicated in FIGS. 14, 15. The cutting members 11 in FIGS. 14 and 15 differ in that a cutting segment in FIG. 14 is formed of carbide metal extending approximately parallel to the cutting direction, while the cutting member 11 in FIG. 15 is a polycrystalline diamond cutting edge arranged at an angle to the cutting direction.

Figure 16:
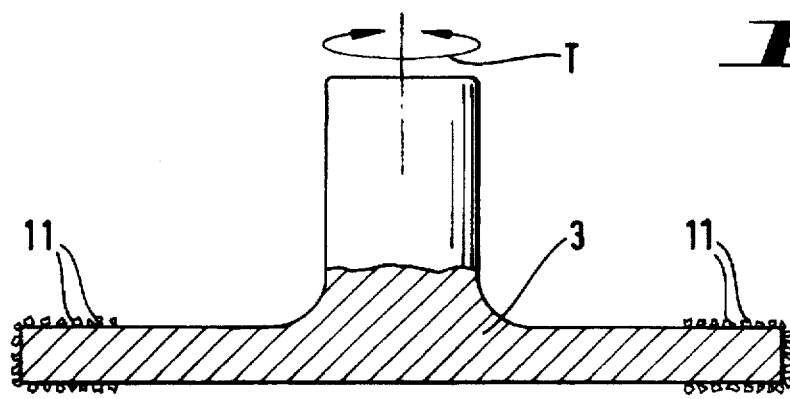
FIG. 16 is an elevational view, partly in section, of another embodiment of a tool bit usable in the manual tool illustrated in FIG. 13.

A disk-shaped tool bit 3 for effecting work in slots is shown in FIG. 16 and has cutting members 11 with undefined cutting edges at its outer circumference and around its outer edge regions. The disk is tuned in the axial direction to torsional vibrations of $\lambda/2$. The introduced torsional vibrations result in torsional vibrations of the disk in the direction of the cutting force. The ratio of the diameters of the shaft carrying the disk and of the disk can amount up to approximately 1–4.

Figure 17:
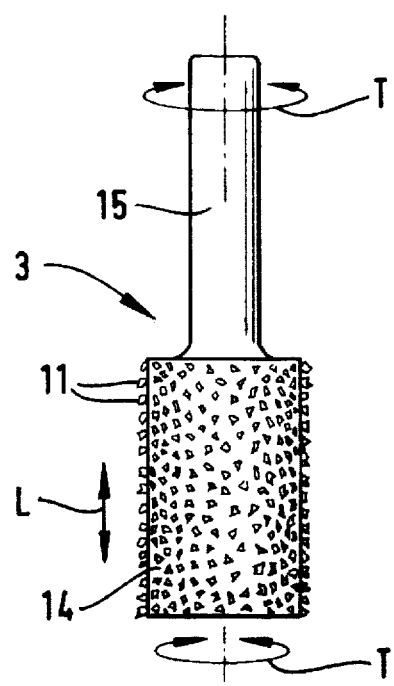
FIG. 17 is an elevational view of a further embodiment of a tool bit usable in the manual tool shown in FIG. 13.

A finger-shaped grinding tool 3 is shown in FIG. 17 and is used for working in slots. The grinding tool 3 has a stem-shaped insertion end 15 and a larger diameter cylindrical body extending from the insertion end. Cutting members 11 with undefined cutting edges are disposed around the circumferentially extending surface of the body 14. The length of the tool bit amounts to n $\lambda/2$ where n=1, 2, 3 ... The introduced ultrasonic torsional vibrations result in a torsional vibration of the tool bit in the cutting direction.

Figure 18:
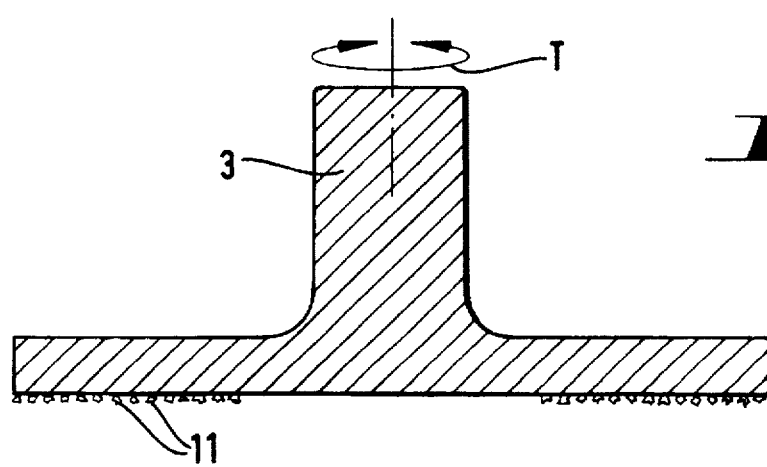
FIG. 18 is an elevational view of still another embodiment of a tool bit usable in the manual tool displayed in FIG. 13.

In FIG. 18 a grinding tool bit 3 shown in the form of a pot shaped or planar disk. The side of the disk facing away from the insertion end is formed with cutting members 11 with undefined cutting edges. The axial length of the tool bit 3 amounts to n $\lambda/2$, where n=1, 2, 3 . . . The introduced ultrasonic torsional vibration excites the disk to perform torsional vibrations. Accordingly, the disk vibrates in the direction of the cutting force.

FIG. 19 displays a vibration amplifier formed as a suction device in axial section. The amplifier 5 has an axially extending bore 20 into which radially extending suction channels 21 empty. The mouth regions 22 of the suction channels 21 are disposed in the region of the vibration nodes of the generated ultrasonic vibrations. In the embodiment illustrated, the suction channels 21 empty into the region of the bearing 7, 8 of the rotatable vibration amplifier 5.

The circumferentially extending set of teeth transmit the driving force of the driving unit to the vibration amplifier 5. The driving unit is the same as shown in FIG. 1. In an alternate embodiment, not shown, a separate suction module can be disposed upstream of the vibration amplifier 5 and preferably it can be connected to the amplifier so that it does not rotate relative to it. The design of the suction module is analogous to the vibration amplifier 5 formed as a suction device. The drilling fines or drilled materials are sucked away or aspirated through the axial bore 20 and flow in the direction of the arrow through the radial suction channels 21 to a vacuum cleaner connected to the channels, not shown.

The vibrations of the tool bit, excited by the ultrasonic vibration, assist, the abrasive or chip producing material removing mechanism, due to the rotation of the tool bit by means of an additional material removing mechanism in the form of a direct blow tool bit in the direction of the contact pressure force, the cutting force or laterally thereto. Due to this superimposition of the two material removal mechanisms, the rate of removal is further increased. At the same time, a contact pressure force applied by the operator of the tool is reduced. This permits an expansion of the application uses of the manual tool. The noise and vibration strain on the operator of the manual tool embodying the invention is reduced by the ultrasonic assist compared to hammer drill tools. The wear of the tool bits used in the manual tool, for instance due to friction or chemical interaction between the cutting edge of the tool bit and the work piece, is reduced. The heat accumulation and consequent load at the cutting edge of the tool bit is reduced. These various improvement features increase the useful life of the combination manual tool-tool bit even more. The safety of the combination manual tool-tool bit for grinding operations is increased by the reduction of the number of revolutions required for the tool bits as compared to known grinding tools. The inventive hand tool in combination with the tool bits can be used for removing material from brittle stock as well as machining non-ductile stock, for instance soft metals such as aluminum, copper and the like. The possibility is also created by the above improvements for further reducing the development of dust which causes a nuisance for the operator and occurs in the course of removing material from stock.

While specific embodiments of the invention have been shown and described in detail to illustrate the inventive principles, it will be understood that the invention may be embodied otherwise without departing from such principles.

We claim:

1. Manual tool for removing material from brittle or non-ductile stock, comprises a housing (1), a drive unit (2) located within said housing (1), an axially extending tool bit (3) mounted in said housing and rotatable about its axis by said drive unit (2), an electro-acoustic converter (4) and a vibration amplifier (5) located within said housing (1) and arranged for superimposing ultrasonic vibrations on the rotational action of said tool bit (3) ultrasonic vibrations have a frequency and an amplitude defined by the equation:

$$0.5 \cdot V > \omega \cdot 2 \cdot a > 5 \cdot V$$

wherein the symbol $\omega$ is the angular frequency, a is the amplitude of the ultrasonic vibration, and V is the cutting velocity of the tool bit (3) in the stock to be removed in meters per second.

2. Manual tool, as set forth in claim 1, wherein said electro-acoustic converter (4) delivers an ultrasonic output in the range of approximately 100 watts to approximately 1,000 watts.

3. Manual tool, as set forth in claim 1, wherein the electro-acoustic converter (4) delivers an ultrasonic output in the range of approximately 200 watts to approximately 500 watts.

4. Manual tool, as set forth in claim 1, wherein said electro-acoustic converter (4) is one of a magnetostrictive and piezoelectric converter.

5. Manual tool, as set forth in claim 1, wherein said tool bit (3) is secured in a tool bit chuck (6) located in the region of a vibration node of the generated ultrasonic vibrations.

6. Manual tool, as set forth in claim 1, wherein the jointing points of individual components of the electro-acoustic converter (4) and the vibration amplifier (5) being arranged in regions of vibration nodes of the generated ultrasonic vibrations.

7. Manual tool, as set forth in claim 1, wherein the axial length of the tool bit (3) is dimensioned so that an anti-node of the ultrasonic vibrations produced contacts a region of said tool bit (3) arranged to contact the stock to be worked.

8. Manual tool as set forth in claim 1, wherein the said tool bit (3) is formed of a material having a lower damping as compared to the ultrasonic vibrations and is formed of one of a heat-treated carbon steel, aluminum alloy and titanium alloy.

9. Manual tool, as set forth in claim 1, wherein said vibration amplifier (5) being rotatably supported within said housing (1) and being rotatable by said drive unit (2) around its axis, and said tool bit (3) being secured in a tool bit chuck (6) extending axially directly from said vibration amplifier (5).

10. Manual tool for removing material from brittle or non-ductile stock, comprises a housing (1), a drive unit (2) located within said housing (1), and an axially extending tool bit (3) mounted in said housing and rotatable about its axis by said drive unit (2), an electro-acoustic converter (4) and a vibration amplifier (5) located within said housing (1) and arranged for superimposing ultrasonic vibrations on the rotational action of said tool bit (3), said electro-acoustic converter (4) being arranged for producing axially directed ultrasonic vibrations (L) having a wave length ($\lambda$) in the range of 10 to 40 centimeters and with the ultrasonic vibrations being coupled into the tool bit (3).

11. Manual tool, as set forth in claim 10, wherein said tool bit (3) being one of a tubular and rod-shaped tool bit having a length n $\lambda/2$ where n=1, 2, 3 . . . and said tool bit being equipped with cutting members at a leading end thereof remote from said electro-acoustic converter (4).

12. Manual tool, as set forth in claim 11, wherein a recess (12) being located in the leading end of each cutting member (11) as viewed in a cutting direction (S) of said tool bit.

13. Manual tool, as set forth in claim 11, wherein said tool bit (3) is a tubular shaped tool bit with cutting members (11) and said cutting members (11) being asymmetrically arranged at the leading end thereof.

14. Manual tool, as set forth in claim 10, wherein said tool bit (3) is a disc-shaped tool bit having an external diameter with cutting members (11) at a circumferential surface thereof and at side edge regions thereof adjacent said circumferential surface, and said tool bit having an axial extent defined by the equation n λ/2 where n=1, 2, 3, ..., and having a central region with an axially extending bore (13) having a diameter (b), and said tool bit (3) having an average diameter defined as half the sum of the external diameter (d) and the internal diameter (b) and being tuned to one of a radial resonant or natural frequency of the disc-shaped tool bit (3) according to an equation $$f_r = C_L D_M \pi$$

wherein $f_r$ is one of the radial resonant or natural frequency, $C_L$ is the axial speed of sound in the tool bit (3) and $D_M$ is the average diameter of the disc-shaped tool bit (3).

15. Manual tool, as set forth in claim 10, wherein said tool bit (3) is a disc-shaped tool bit having cutting members (11) at an outer circumferential surface thereof and at outer edge regions adjoining said circumferential surface, said disc-shaped tool bit having an axial extent defined by the equation n λ/2 where n=1, 2, 3, ..., and having an external diameter (d) being an integer multiple of half the wave length of bending waves on the tool bit (3) induced by axially directed ultrasonic vibrations (L).

16. Manual tool, as set forth in claim 10, wherein said tool bit (3) is a finger-shaped grinding tool bit (14, 15) having a circumferentially extending surface covered with cutting members (11) and having an axial length which is an integer multiple of half the wave length of said axially directed ultrasonic vibrations in said disc-shaped grinding tool bit (3).

17. Manual tool, as set forth in claim 10, wherein said tool bit is a grinding tool bit in the shape of a pot or planar disc equipped with grinding members in its region, coming into contact with the material to be worked, said grinding tool bit having an axial extent amounting to n λ/2 where n=1, 2, 3 ..., and having an external diameter being an integer multiple of half the wavelength of bending waves on the tool bit induced by axially directed ultrasonic vibrations.

18. Manual tool, as set forth in claim 10, wherein said tool bit (3) is a roll-shaped grinding tool bit having an axially extending circumferential surface (19) with cutting members (11) therein and having an axial extent defined by n λ/2, where n=1, 2, 3 ..., and said tool bit comprises an axial bore (13) having an internal diameter (b), and said tool bit has an average diameter defined as half the sum of an external diameter (d) of the axially extending circumferential surface and the internal diameter (b) and being tuned to one of a radial resonant or natural frequency of the roll-shaped tool bit (3), according to the equation:

$$f_r = C_L D_M \pi$$

where $f_r$ stands for one of the radial resonant and the natural frequency, $C_L$ stands for the axial speed of sound in the tool bit; and $D_L$ stands for the average diameter of said roll-shaped tool bit.

19. Manual tool for removing material from brittle or non-ductile stock, comprises a housing (1), a drive unit (2) located within said housing (1), and an axially extending tool bit (3) mounted in said housing and rotatable about its axis by said drive unit (2), an electro-acoustic converter (4) and a vibration amplifier (5) located within said housing (1) and arranged for superimposing ultrasonic vibrations on the rotational action of said tool bit (3), said electro-acoustic converter (4) is arranged for producing torsional vibrations having a wave-length in the range of approximately 10 to 40 centimeters with said torsional vibrations being coupled into said tool bit (3).

20. Manual tool, as set forth in claim 19, wherein said tool bit (3) is one of a tubular and rod-shaped tool bit having a length n λ/2 where n=1, 2, 3, ..., and is equipped with cutting members at a leading end thereof remote from said electro-acoustic converter (4).

21. Manual tool, as set forth in claim 20, wherein a recess (12) is provided adjacent each said cutting member and is positioned trailing said cutting member in the cutting direction (S) thereof.

22. Manual tool, as set forth in claim 19, wherein said tool bit (3) being a disc-shaped tool bit having an outer circumferential surface with cutting members (11) in an outer circumferential surface and with said cutting members located in edge regions of said disc adjacent to its circumferential surface, and said tool bit having an axial extent n λ/2 where n=1, 2, 3 ....

23. Manual tool, as set forth in claim 22, wherein said disc-shaped tool bit having a diameter of said circumferential surface of approximately four times the diameter of a shaft supporting said disc.

24. Manual tool for removing material from brittle or non-ductile stock, comprises a housing (1), a drive unit (2) located within said housing (1), and an axially extending tool bit (3) mounted in said housing and rotatable about its axis by said drive unit (2), an electro-acoustic converter (4) and a vibration amplifier (5) located within said housing (1) and arranged for super-imposing ultrasonic vibrations on the rotational action of said tool bit (3), said vibration amplifier (5) having an axial bore (20) with radially extending suction channels (21) open to said axial bore (20) and located in a region of vibration nodes of the ultrasonic waves generated in said manual tool.

25. Manual tool for removing material from brittle or non-ductile stock, comprises a housing (1), a drive unit (2) located within said housing (1), and an axially extending tool bit (3) mounted in said housing and rotatable about its axis by said drive unit (2), an electro-acoustic converter (4) and a vibration amplifier (5) located within said housing (1) and arranged for super-imposing ultrasonic vibrations on the rotational action of said tool bit (3), a suction module being located upstream of said vibration amplifier (5) and having a length n λ/2 where n=1, 2, 3, ..., and having an axial bore with radial channels at said axial bore being disposed in a region of vibration nodes of the ultrasonic vibrations generated in said manual tool.

* * * * *

UNITED STATES PATENT AND TRADEMARK OFFICE
CERTIFICATE OF CORRECTION

PATENT NO.   : 5,733,074
DATED        : March 31, 1998
INVENTOR(S)  : Maximilian Stöck, et al It is certified that error appears in the above-indentified patent and that said Letters Patent is hereby corrected as shown below:

On the title page, insert item

[75] Inventors: Maximilian Stöck, Azmoos, Switzerland; Josef Obermeier, Peiting, Germany; Eugen Magyari, Gams, Switzerland; Peter Ofner, Feldkirch, Austria.

Signed and Sealed this

Seventh Day of July, 1998

Attest:

BRUCE LEHMAN

*Attesting Officer*   *Commissioner of Patents and Trademarks*